(12) United States Patent
Lin et al.

(10) Patent No.: US 8,740,393 B2
(45) Date of Patent: Jun. 3, 2014

(54) GUIDING DEVICE AND PROJECTOR COMPRISING THE SAME

(75) Inventors: Chia-Jui Lin, Taoyuan Hsien (TW); Hsiu-Ming Chang, Taoyuan Hsien (TW); Hui-Chih Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 273 days.

(21) Appl. No.: 13/166,411

(22) Filed: Jun. 22, 2011

(65) Prior Publication Data
US 2012/0069306 A1 Mar. 22, 2012

(30) Foreign Application Priority Data
Sep. 16, 2010 (TW) ............... 099131419 A

(51) Int. Cl.
G03B 21/16 (2006.01)
F21V 29/00 (2006.01)
F21V 7/20 (2006.01)

(52) U.S. Cl.
USPC ........... 353/61; 353/57; 353/60; 362/294; 362/345

(58) Field of Classification Search
USPC ........... 353/61, 57, 52, 60, 98; 362/294, 345
See application file for complete search history.

(56) References Cited

U.S. PATENT DOCUMENTS

| | | | |
|---|---|---|---|
| 6,398,366 B1 * | 6/2002 | Hara et al. | 353/57 |
| 6,902,275 B2 * | 6/2005 | Yamada et al. | 353/61 |
| 2004/0228130 A1 * | 11/2004 | Kato et al. | 362/294 |
| 2005/0162618 A1 * | 7/2005 | Morita et al. | 353/57 |
| 2005/0264766 A1 | 12/2005 | Morimoto et al. | |
| 2006/0164843 A1 * | 7/2006 | Adachi et al. | 362/373 |
| 2008/0246925 A1 | 10/2008 | Zheng et al. | |

FOREIGN PATENT DOCUMENTS

| | | |
|---|---|---|
| CN | 1670617 | 9/2005 |
| CN | 1790155 | 6/2006 |
| CN | 101470335 | 7/2009 |
| CN | 101762964 | 6/2010 |
| JP | 2005-24735 | 1/2005 |
| JP | 2008-310132 | 12/2008 |

OTHER PUBLICATIONS

Office Action from corresponding Chinese Appln. No. 201010507027.1 dated Mar. 7, 2013. English translation attached.
Office Action from corresponding Taiwanese Appln. No. 099131419 dated Jul. 23, 2013. English translation attached.

* cited by examiner

Primary Examiner — Georgia Y Epps
Assistant Examiner — Magda Cruz
(74) Attorney, Agent, or Firm — Grossman, Tucker, Perreault & Pfleger, PLLC

(57) ABSTRACT

A guiding device and a projector comprising the same are provided. The projector comprises a blower and a bulb. The blower is used for cooling the bulb. The guiding device is disposed between the blower and the bulb, and comprises a body and a flapper. The body of the guiding device is formed with a first outlet and a second outlet. The first outlet and the second outlet are adapted to guide the blower to form a first airflow and a second airflow, respectively. The flapper is disposed in the second outlet and moves along a direction of gravity to partially cover the second outlet to force the second airflow to flow towards a portion of the bulb away from the direction of gravity.

16 Claims, 10 Drawing Sheets

1

GUIDING DEVICE AND PROJECTOR COMPRISING THE SAME

This application claims the benefit of the priority based on Taiwan Patent Application No. 099131419 filed on Sep. 16, 2010, the disclosure of which is incorporated herein by reference in its entirety.

CROSS-REFERENCES TO RELATED APPLICATIONS

Not applicable.

BACKGROUND OF THE INVENTION

1. Field of the Invention

The present invention provides an airflow guiding device, and more particularly, to a guiding device for use in a projector, which can guide an airflow generated by a blower to a bulb for cooling the bulb.

2. Descriptions of the Related Art

In reference to FIG. 1A, in conventional projectors 1, high temperatures are generated during the operation of a bulb 20 which causes damage to the bulb 20 and/or other internal components. Therefore, the conventional projector 1 must be provided with a blower 10 so that airflow generated by the blower 10 is guided by a pipe 11 and a guiding device 30 towards the bulb 20 to lower the temperature of the bulb 20.

In reference to FIG. 1B, in detail, the bulb 20 has a front end 201 and a rear end 202. The gas for light emission is more concentrated on the upper portion 202a of the bulb 20, so when a high temperature is generated during the operation of the bulb 20, the upper portion 202a of the bulb 20 has a first temperature higher than a second temperature of a lower portion 202b of the bulb 20. When airflow generated by the blower 10 flows through the pipe 11 to a first outlet 311 and a second outlet 312 formed on a body 31 of the guiding device 30, the first outlet 311 and the second outlet 312 generate a first airflow 111 blowing towards the front end 201 of the bulb 20 and a second airflow 112 blowing towards the rear end 202 of the bulb 20 respectively. Here, the second airflow 112 blows towards both the upper portion 202a and the lower portion 202b of the bulb 20 simultaneously, so although this can lower the temperature of the bulb 20 itself, the difference between the first temperature of the upper portion 202a and the second temperature of the lower portion 202b cannot be reduced. Consequently, a large difference in the temperature can decrease the service life of the bulb 20.

Therefore, as shown in FIG. 1C, in the prior art, a fixed baffle 32 is disposed on the lower portion of the second outlet 312 of the guiding device 30. The second airflow 112 only blows toward the upper portion 202a of the bulb 20 but not towards the lower portion 202b of the bulb 20. Thereby, the difference in temperature between the upper portion 202a and the lower portion 202b is reduced and thus the service life of the bulb 20 is prolonged.

As shown in FIG. 1D, when the projector 1 is used upside down (e.g., hung upside down from a ceiling), the bulb 20 has a temperature distribution similar to what is described above: the upper portion 202a of the bulb 20 has a first temperature higher than a second temperature of the lower portion 202b of the bulb 20. However, it shall be noted that due to the upside-down orientation, the fixed baffle 32 of the guiding device 30 is now located at the upper portion of the second outlet 312; therefore, the fixed baffle 32 will guide the second airflow 112 towards the lower portion 202b of the bulb 20 to further lower the second temperature which is already lower than the first temperature of the upper portion 202a. Consequently, the difference in temperature between the upper portion 202a and the lower portion 202b is actually larger than the difference in temperature before the fixed baffle 32 is provided, and this further shortens the service life of the bulb 20 significantly.

In view of this, there is an urgent need in the art to provide a solution to effectively control the airflow direction such that the difference between the first temperature of the upper portion of the bulb and the second temperature of the lower portion of the bulb can be minimized regardless of the usage status of the projector.

SUMMARY OF THE INVENTION

An objective of the present invention is to provide a guiding device for use in a projector and a projector using the guiding device. The guiding device is able to minimize the difference in temperature between the upper portion of bulb and lower portion of the bulb in various usage statuses of the projector to prolong the service life of the bulb.

To achieve the aforesaid objective, the guiding device of the present invention comprises a body and a flapper. The guiding device is disposed between a bulb and a blower for cooling the bulb of the projector. The body of the guiding device is formed with a first outlet and a second outlet for guiding the blower to produce a first airflow and a second airflow, respectively. The flapper of the present invention is disposed in the second outlet, and moves along a direction of gravity to partially cover the second outlet so that the second airflow flows toward a portion of the bulb away from the direction of gravity.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
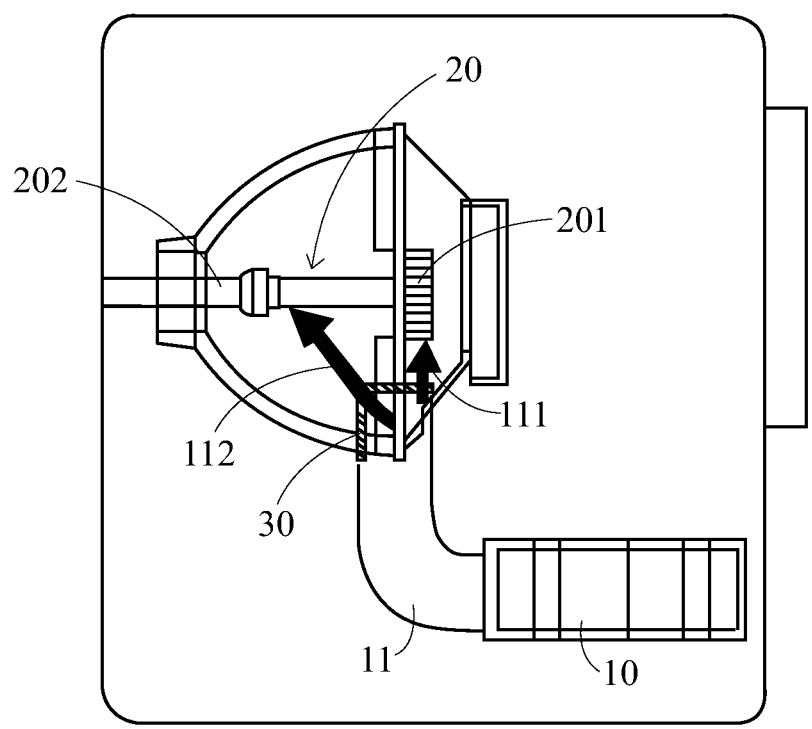
FIG. 1A is a schematic top view of a conventional projector.
Figure 1B:
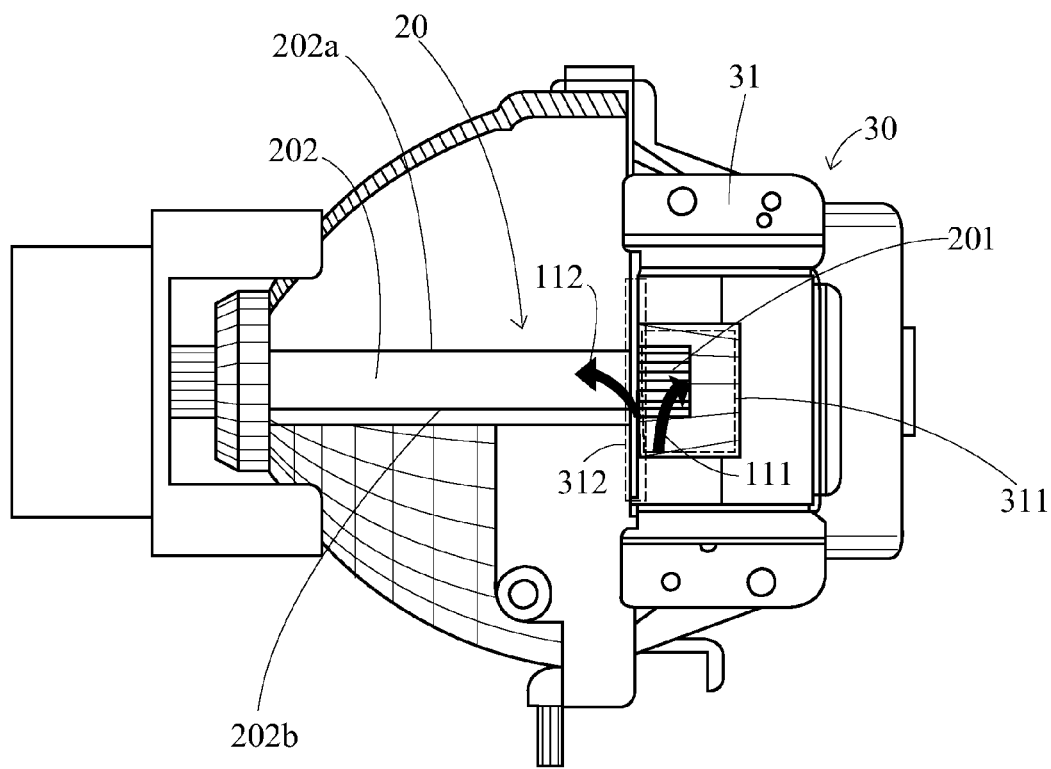
FIG. 1B is a schematic side view of a conventional bulb and a conventional guiding device.
Figure 1C:
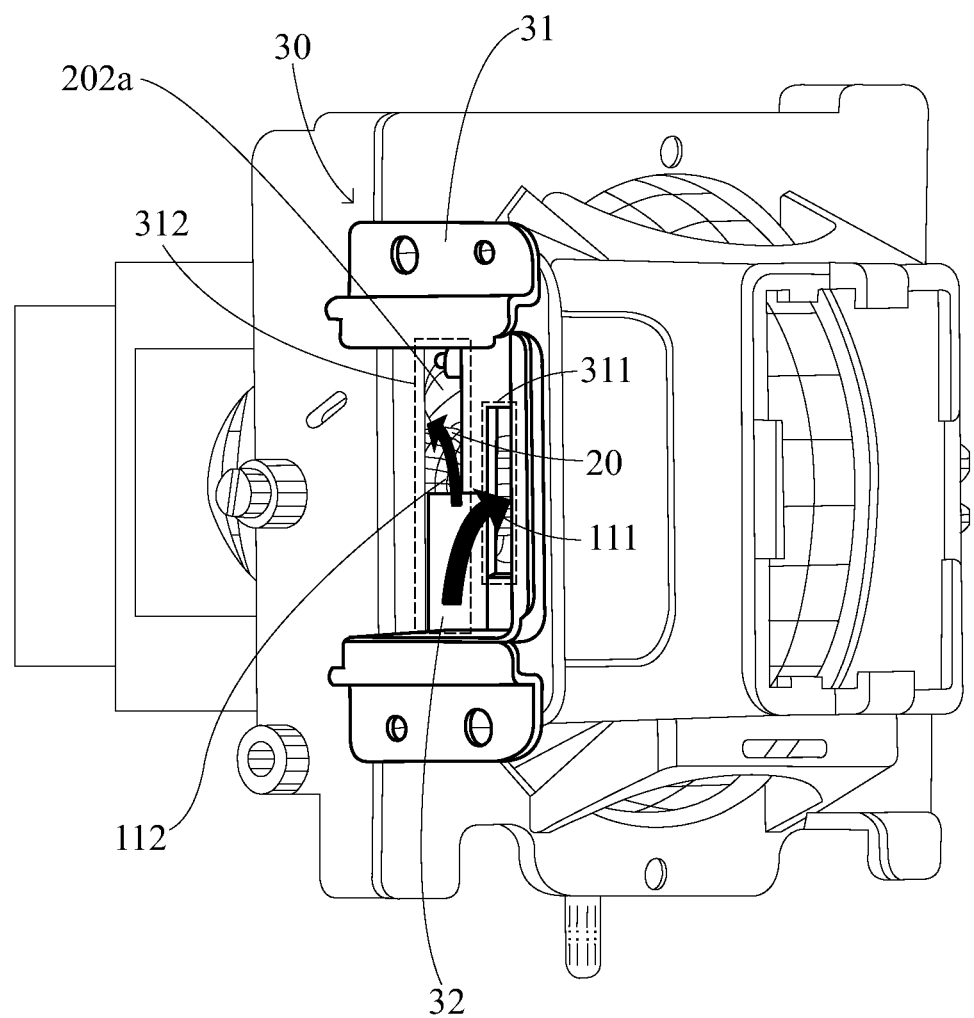
FIG. 1C is a schematic view showing an airflow of the bulb and the guiding device when the conventional projector is placed upright.
Figure 1D:
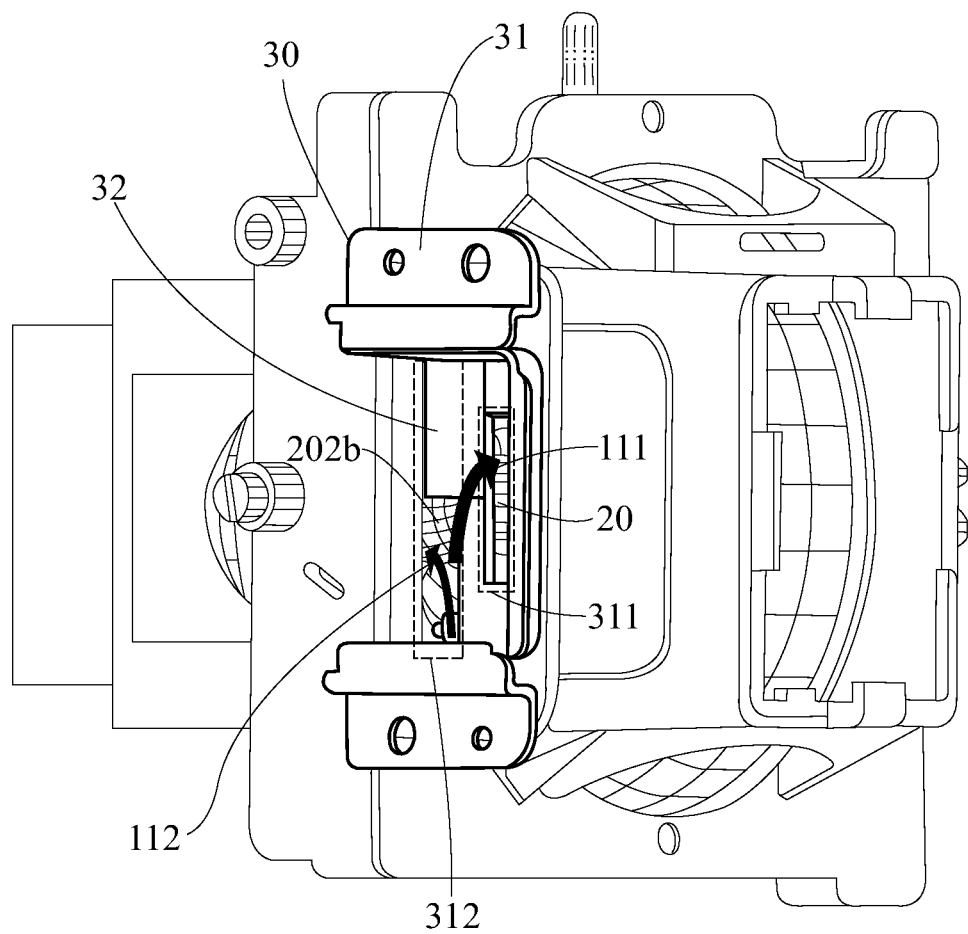
FIG. 1D is a schematic view showing an airflow of the bulb and the guiding device when the conventional projector is placed upside down.
Figure 2A:
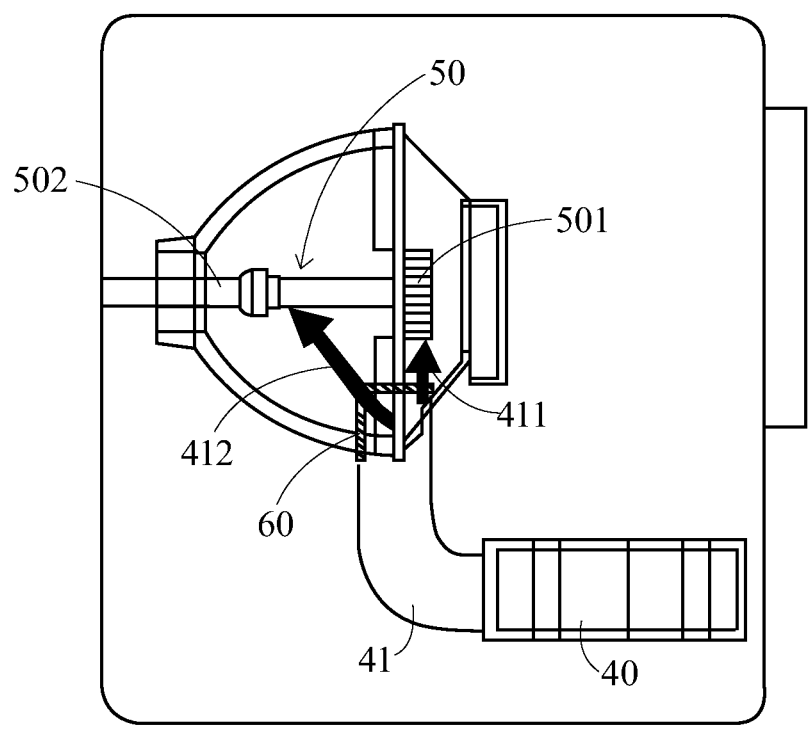
FIG. 2A is a schematic top view of a projector of the present invention.
Figure 2B:
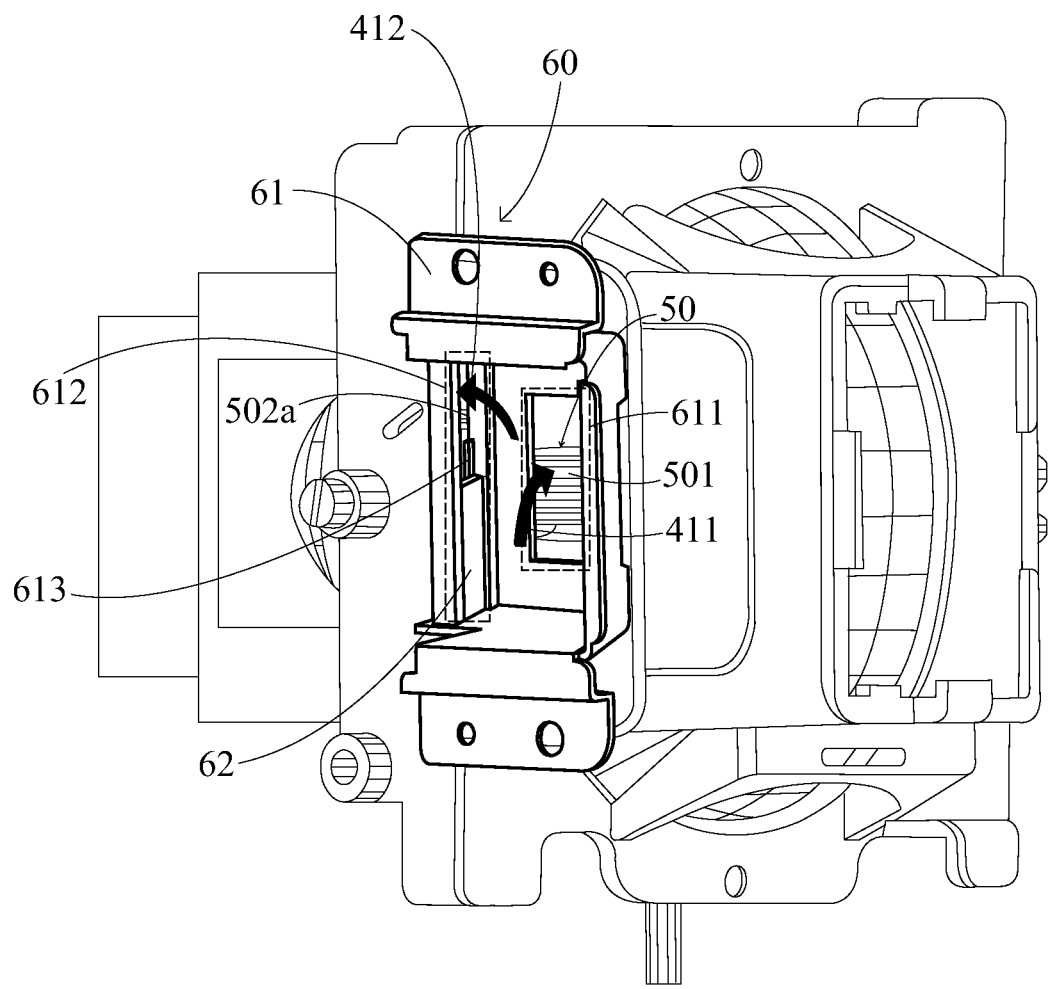
FIG. 2B is a schematic perspective view of a bulb and a guiding device of the present invention.

FIG. 2A illustrates a guiding device 60 of the present invention that is used in a projector 4. The projector 4 comprises a blower 40 and a bulb 50. The blower 40 is used to cool the bulb 50, and the guiding device 60 is disposed between the blower 40 and the bulb 50. An airflow generated by the blower 40 is transferred to the guiding device 60 through a pipe 41. Next, in reference to FIG. 2B, the guiding device 60 comprises a body 61 and a flapper 62. The body 61 is formed with a first outlet 611 and a second outlet 612 for guiding the blower 40 to produce a first airflow 411 and a second airflow 412 respectively. The flapper 62 is disposed in the second outlet 612, and moves along the direction of gravity to partially cover the second outlet 612 so that the second airflow 412 flows towards a portion of the bulb 50 away from the direction of gravity.

In practical use, the first outlet 611 typically corresponds to a front end 501 of the bulb 50 to guide the first airflow 411 generated by the blower 40 towards the front end 501, while the second outlet 612 typically corresponds to a rear end 502 of the bulb 50 to guide the second airflow 412 towards the rear end 502.

For the guiding device 60 of the present invention, regardless of whether the projector 4 is placed upright or upside down (e.g., hung upside down from a ceiling), the flapper 62 moves along the direction of gravity in the second outlet 612 to partially cover the lower portion of the second outlet 612, thereby guiding the second airflow 412 towards the upper portion 502a of the rear end 502 of the bulb 50. In this way, the second airflow 412 mainly cools the upper portion 502a with the higher temperature of the rear end 502 of the bulb 50. This reduces the difference in temperature between the upper portion 502a and lower portion of the rear end 502 of the bulb 50 to prolong the service life of the bulb 50.

Figure 3A:
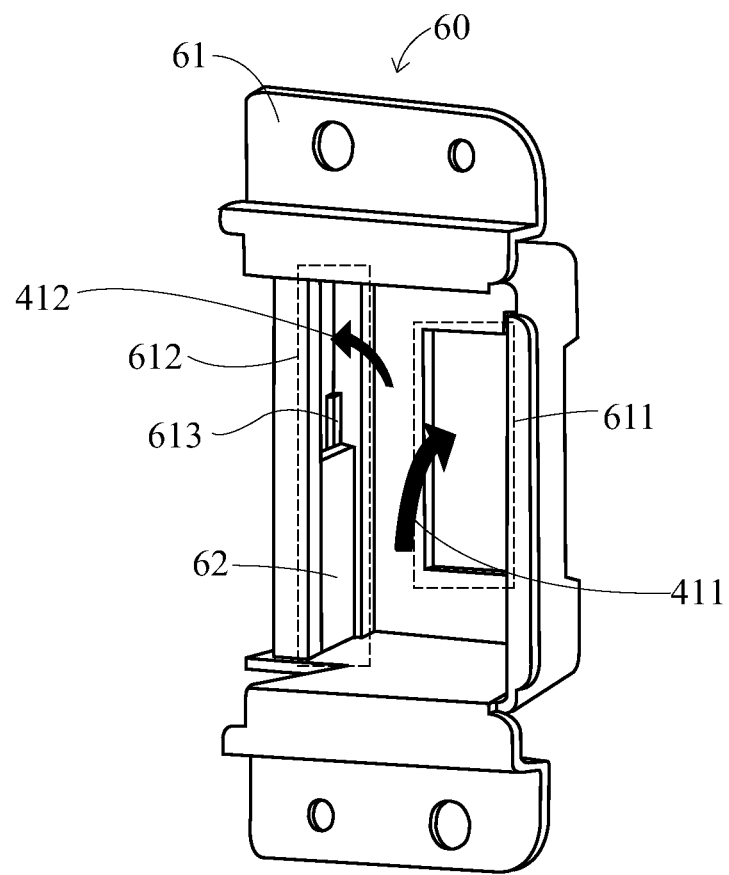
FIG. 3A is a schematic view of the first embodiment of the guiding device of the present invention.

The first embodiment of the guiding device 60 of the present invention is shown in FIG. 3A. The body 61 of the guiding device 60 has a slot 613 disposed in the second outlet 612, and two lateral edges of the flapper 62 are slidably disposed in the slot 613. When the projector 4 is in an upright orientation, the flapper 62 moves along the direction of gravity in the slot 613 to partially cover the lower portion of the second outlet 612 and guide the second airflow 412 towards the upper portion 502a of the rear end 502 of the bulb 50 away from the direction of gravity. On the other hand, when the projector 4 is placed upside down (e.g., hung upside down from a ceiling), the flapper 62 slides downwards along the slot 613 with gravity from the original position in the upright status of the projector 4 to partially cover the lower portion of the second outlet 612 again; as a result, the second airflow 412 still flows toward the upper portion 502a of the rear end 502 of the bulb 50 to lower the temperature of the upper portion 502a, which has a higher temperature, of the rear end 502 of the bulb 50. Thus, the difference in temperature between the upper portion 502a and the lower portion of the rear end 502 of the bulb 50 is reduced.

Figure 3B:
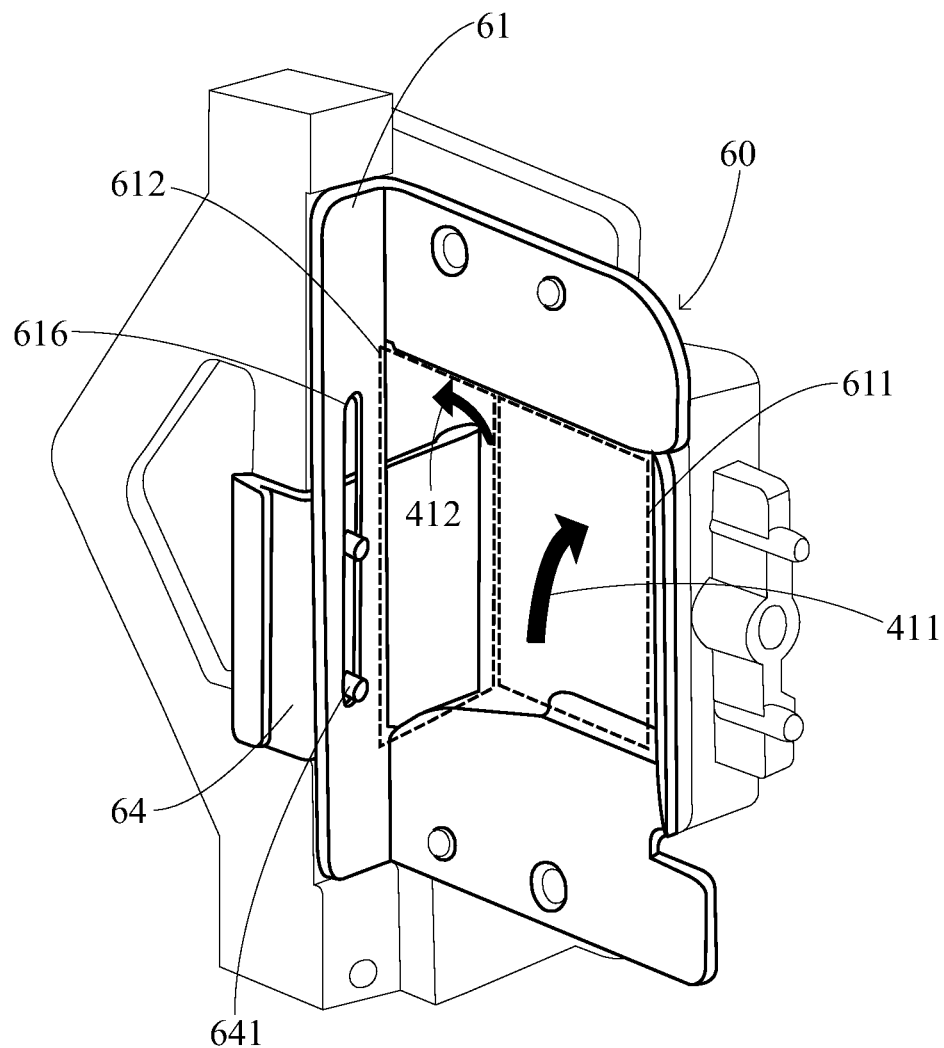
FIG. 3B is a schematic view of the second embodiment of the guiding device of the present invention.

The second embodiment of the present invention is shown in FIG. 3B. The body 61 of the guiding device 60 has a slot 616 of another form, which is disposed adjacent to the second outlet 612. Correspondingly, the guiding device 60 comprises a flapper 64 of another form, which has at least one protruding portion 641 slidably disposed in the slot 616. In this embodiment, the number of the at least one protruding portion 641 may be two. Through the sliding of the protruding portions 641 in the slot 616, the flapper 64 slides towards the lower portion of the second outlet 612 with gravity to partially cover the lower portion of the second outlet 612 and guide the second airflow 412 towards the upper portion 502a of the rear end 502 of the bulb 50.

Figure 3C:
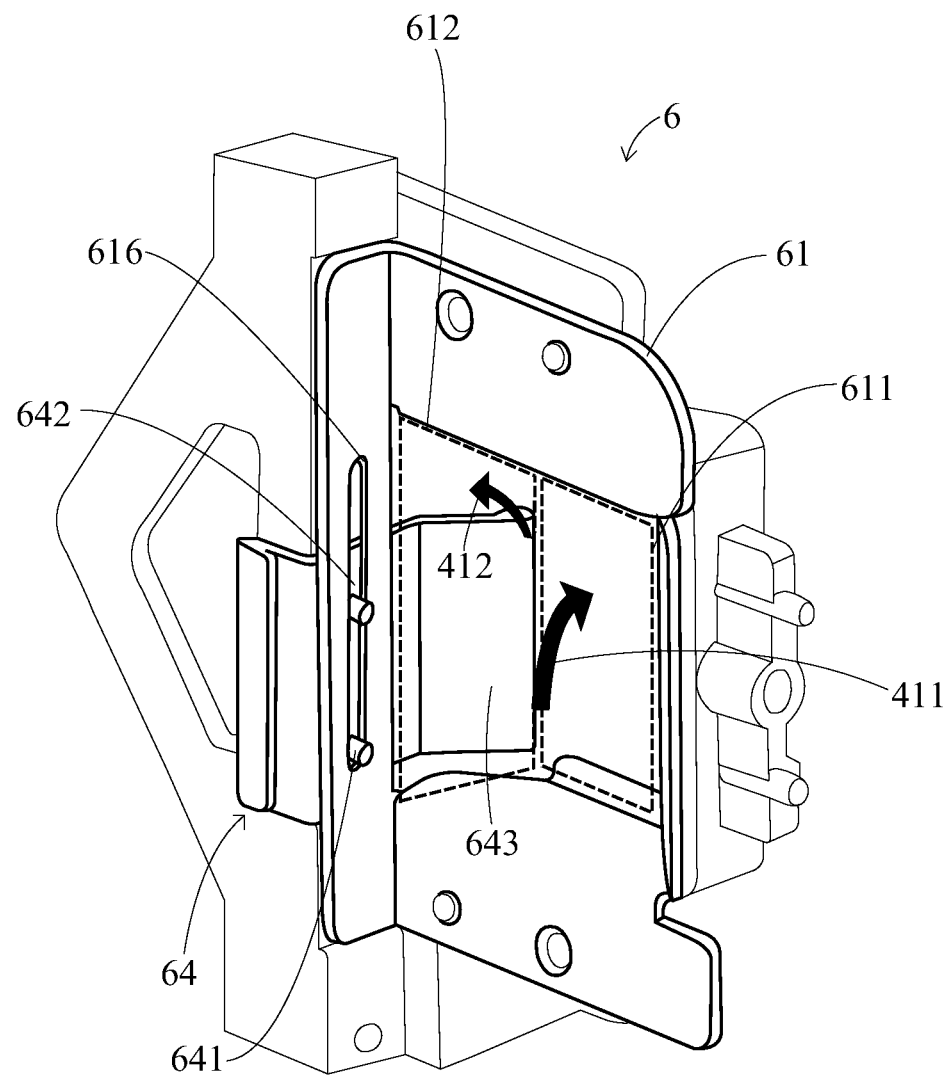
FIG. 3C is a schematic view of the third embodiment of the guiding device of the present invention.

As shown in FIG. 3C, the third embodiment of the present invention is similar to the second embodiment. The flapper 64 of the third embodiment may further comprise a sliding portion 642 and a guiding portion 643. The protruding portions 641 are formed on the sliding portion 642, and are slidably disposed in the slot 616. In this embodiment, the guiding portion 643 and the sliding portion 642 are formed with an angle for adjusting and guiding the first airflow 411 and the second airflow 412 towards the first outlet 611 and the second outlet 612 respectively. In the third embodiment of the present invention, portions similar to those of the second embodiment will not be further described herein.

Figure 3D:
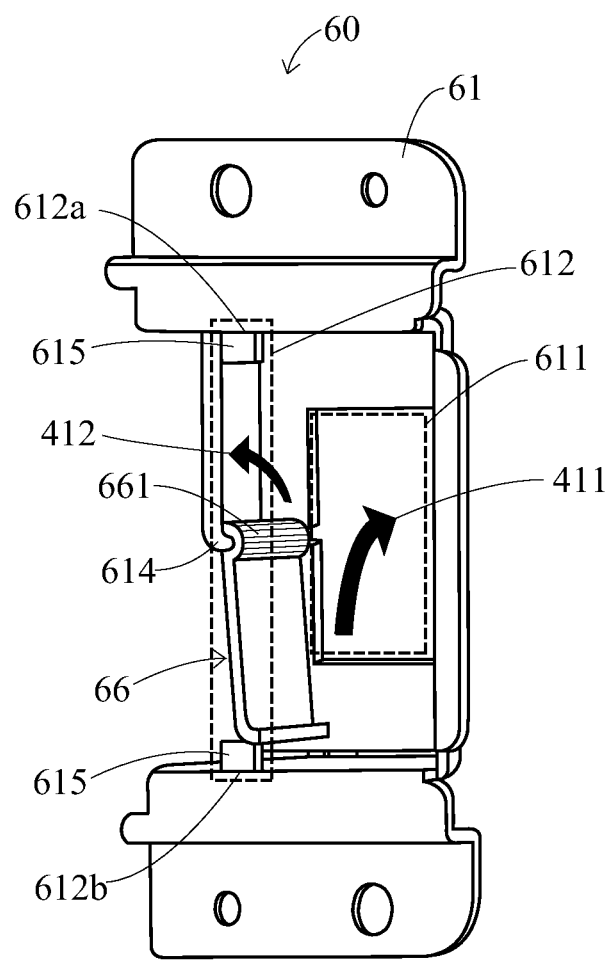
FIG. 3D is a schematic view of the fourth embodiment of the guiding device of the present invention.

The fourth embodiment of the present invention is shown in FIG. 3D. The body 61 of the guiding device 60 has a pivot 614 disposed in the second outlet 612, and in this embodiment, a lateral edge 661 of the flapper 66 is joined to the pivot 614 to swing up and down around the pivot 614. Therefore, with gravity, the flapper 66 swings towards the lower portion of the second outlet 612 to partially cover the second outlet 612 and guide the second airflow 412 towards the upper portion 502a of the rear end 502 of the bulb 50. In this embodiment, the body 61 may further comprise two bumps 615 disposed adjacent to an upper end 612a and a lower end 612b of the second outlet 612 respectively to stop the flapper 66 when the flapper 66 swings to the upper end 612a or the lower end 612b by swinging with an angle no greater than 180 degrees. Thereby, the swaying of the flapper 66 due to the airflow, which would otherwise make it impossible to effectively cover the lower portion of the second outlet 612, can be avoided. Meanwhile, the bumps 615 forces the flapper 66 to include a vertical angle to prevent the flapper 66 from smoothly swinging towards the lower portion of the outlet 612 in response to the change in the positioning direction as its barycenter just passes through the pivot 614.

According to the above descriptions, through the design of the flapper, the guiding device of the present invention can, in response to different positioning directions of the projector in different applications, particularly enhance the heat dissipation of the upper portion of the bulb away from the direction of gravity to reduce the difference in temperature between the upper portion of the bulb and the lower portion of the bulb, thereby effectively prolonging the service life of the bulb.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A guiding device for use in a projector, the projector comprising a blower and a bulb, the blower being used for cooling the bulb, and the guiding device being disposed between the blower and the bulb, the guiding device comprising:
   a body, being formed with a first outlet and a second outlet disposed adjacent to the first outlet for guiding the blower to produce a first airflow and a second airflow, respectively; and
   a flapper, being disposed in the second outlet, wherein the flapper moves along a gravity direction by use of gravity to partially cover the second outlet;
      wherein by using the flapper to partially cover the second outlet, the second airflow flows toward a portion of the bulb away from the gravity direction.

2. The guiding device as claimed in claim 1, wherein the first outlet corresponds to a front end of the bulb so as to guide the blower to form the first airflow toward the front end, and the second outlet corresponds to a rear end of the bulb so as to guide the second airflow toward the rear end.

3. The guiding device as claimed in claim 1, wherein the body further comprises a slot, the flapper is slidably disposed in the slot to partially cover the second outlet and guide the second airflow toward an upper portion of the bulb.

4. The guiding device as claimed in claim 1, wherein the body further comprises a slot, the flapper is formed with at least one protruding portion and is slidably disposed in the slot to partially cover the second outlet and guide the second airflow toward an upper portion of the bulb.

5. The guiding device as claimed in claim 4, wherein the flapper further comprises a sliding portion and a guiding portion, the at least one protruding portion is formed on the sliding portion, the guiding portion and the sliding portion are formed with an angle for adjusting and guiding the second airflow toward the upper portion of the bulb.

6. The guiding device as claimed in claim 1, wherein the body further comprises a pivot, and the flapper has a lateral edge thereof joined to the pivot to swing around the pivot so that the flapper partially covers the second outlet for guiding the second airflow to an upper portion of the bulb.

7. The guiding device as claimed in claim 6, wherein the flapper swings with an angle less than or equal to 180 degree.

8. The guiding device as claimed in claim 7, wherein the body further comprises two bumps disposed adjacent to an upper end and a lower end of the second outlet respectively, so that when the flapper swings to the upper end or the lower end, the bumps stop the flapper.

9. A projector, comprising:
a bulb;
a blower for cooling the bulb; and
a guiding device, being disposed between the blower and the bulb, comprising:
  a body, being formed with a first outlet and a second outlet disposed adjacent to the first outlet for guiding the blower to produce a first airflow and a second airflow, respectively; and
  a flapper, being disposed in the second outlet, wherein the flapper moves along a gravity direction by use of gravity to partially cover the second outlet;
    wherein by using the flapper to partially cover the second outlet, the second airflow flows toward a portion of the bulb away from the gravity direction.

10. The projector as claimed in claim 9, wherein the first outlet corresponds to a front end of the bulb so as to guide the blower to form the first airflow toward the front end, and the second outlet corresponds to a rear end of the bulb so as to guide the second airflow toward the rear end.

11. The projector as claimed in claim 9, wherein the body further comprises a slot, the flapper is slidably disposed in the slot to partially cover the second outlet and guide the second airflow toward an upper portion of the bulb.

12. The projector as claimed in claim 9, wherein the body further comprises a slot, the flapper is formed with at least one protruding portion and is slidably disposed in the slot to partially cover the second outlet and guide the second airflow toward an upper portion of the bulb.

13. The projector as claimed in claim 12, wherein the flapper further comprises a sliding portion and a guiding portion, the at least one protruding portion is formed on the sliding portion, the guiding portion and the sliding portion are formed with an angle for adjusting and guiding the second airflow toward the upper portion of the bulb.

14. The projector as claimed in claim 9, wherein the body further comprises a pivot, the flapper has a lateral edge thereof jointed to the pivot to swing around the pivot so that the flapper partially covers the second outlet for guiding the second airflow to an upper portion of the bulb.

15. The projector as claimed in claim 14, wherein the flapper swings with an angle less than or equal to 180 degree.

16. The projector as claimed in claim 15, wherein the body further comprises two bumps disposed adjacent to an upper end and a lower end of the second outlet respectively, so that when the flapper swings to the upper end or the lower end, the bumps stop the flapper.

* * * * *